United States Patent Office 3,651,049
Patented Mar. 21, 1972

3,651,049
17α,21 ALKENYLIDENE DIOXY DERIVATIVES OF PREGNANE AND PROCESS FOR PREPARATION THEREOF
Jacques R. Boissier, Paris, and Roger Ratouis, Saint-Cloud, France, assignors to Societe Anonyme dite: Roussel-UCLAF, Paris, France
No Drawing. Filed Mar. 12, 1970, Ser. No. 19,076
Claims priority, application France, Mar. 21, 1969, 6908232
Int. Cl. C07c *173/00*
U.S. Cl. 260—239.55 D        10 Claims

ABSTRACT OF THE DISCLOSURE

Cyclic acetal derivatives of pregnane of general formula:

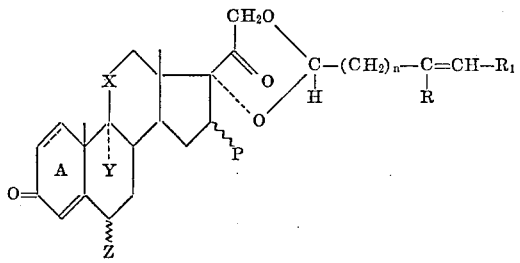

wherein X:CO or $CH_2$ or CHOH—Y:H or F—Z:H or $CH_3$—P:H or alkyl or alkylidene—n: 0 or 1—R:H or halogen or alkyl—$R_1$:H or alkyl or carboxyl or alkoxycarbonyl—broken line in the ring A: optional presence of a double bond.

These products are very useful substances in human and animal therapy, especially owing to their remarkable anti-inflammatory action.

The products are prepared by action of a dialkyl acetal on a pregnane derivative having hydroxyl radicals in its 17 and 21 positions, in the presence of an acid catalyst.

---

The present invention relates to new cyclic acetal derivatives of pregnane, a process for their preparation and their use as medicaments.

These new acetals have the following general Formula I:

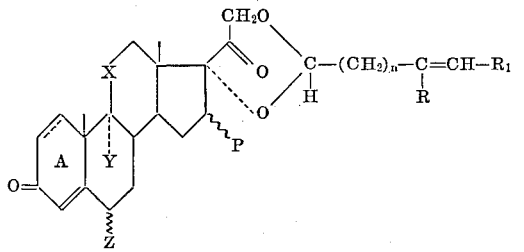

in which X represents a carbonyl group (CO), a methylene group ($CH_2$) or a hydroxymethylene group (CHOH) the hydroxyl radical of which may be in the α or the β position, Y represents a hydrogen atom or a fluorine atom, Z represents a hydrogen atom or a methyl radical, P represents a hydrogen atom, an alkyl radical having one or two carbon atoms or an alkylidene radical having one or two carbon atoms, n is 0 or 1, R represents a hydrogen atom, a halogen atom or an alkyl radical having not more than three carbon atoms and $R_1$ represents a hydrogen atom, an alkyl radical having not more than three carbon atoms, a carboxyl radical on an alkoxy carbonyl radical the alkoxy group of which contains not more than 5 carbon atoms and in which the broken line in ring A of the formula indicates the optional presence of a double bond.

According to the invention, we provide a process for the preparation of the compounds of Formula I in which a dialkyl acetal of the following Formula II:

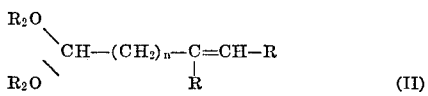

in which R, $R_1$ and n have the meanings indicated above and $R_2$ represents an alkyl radical having not more than 5 carbon atoms is transacetalised in the presence of an acid catalyst with a pregnane derivative having hydroxyl radicals in its 17 and 21 positions, respectively, and having the following Formula III:

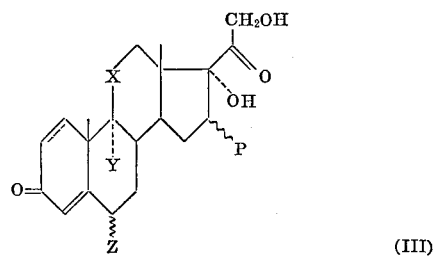

in which X, Y, Z and P have the same meaning as above.

Under the preferred conditions for carrying out this process, the reaction is carried out in an organic solvent which is inert to the reactants, e.g. benzene, toluene, xylene, dimethylformamide, dioxane or tetrahydrofuran. The acid catalyst is preferably an organic acid such as p-toluene sulphonic acid, monochloroacetic acid, oxalic acid or trifluoroacetic acid. The temperature at which the reaction is carried out depends upon the reactivity of the dialkyl acetal of the Formula II and on that of the pregnane derivative of Formula III; in practice, the reaction is generally carried out at a temperature within the range of from room temperature to the boiling point of the reaction mixture. The reaction time also depends upon the reactivity of the compound of Formula II and that of the compound of Formula III; in practice, this may be between one hour and 96 hours.

When the reaction is complete, the solvent and the alcohol of Formula $R_2OH$ formed in the course of the reaction are removed by evaporation under vacuum and the required product of Formula I is obtained in the form of a solid residue which is purified by the usual methods such as chromatography or crystallisation.

To obtain products of the general Formula I in which n=0, a process of preparation is advantageously used in which a β-halogenated dialkylacetal of the Formula IV:

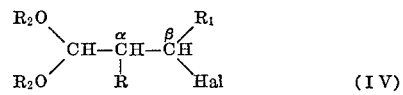

in which R, $R_1$ and $R_2$ have the meanings indicated above and Hal represents a bromine atom or a chlorine atom is reacted with a pregnane derivative of the Formula III indicated above in the presence of an acid catalyst.

In this process, a transacetalation reaction and a dehydrohalogenation reaction between the halogen atom (Hal) and a hydrogen atom attached to the carbon atom substituted by the radical R take place simultaneously. This elimination of a molecule of hydrohalic acid H—Hal is accompanied by the formation of an ethylenic double bond.

The preferred conditions for carrying out this process are identical with those indicated above for the reaction of the compound of Formula II with the compound of Formula III as regards the solvent, the acid catalyst, the reaction temperature and the reaction time.

When the reaction between the compound of Formula IV and the compound of Formula III is complete, the solvent, the alcohol of formula $R_2OH$ and the hydrohalic acid of the formula H—Hal formed in the course of this reaction are removed by evaporation under vacuum and the required product of Formula I is obtained in the form of a solid residue which is purified by the usual methods such as chromatography or crystallisation.

To obtain products of the general Formula I in which $R_1$ represents a carboxyl radical it is particularly advantageous to use a process of preparation in which a compound of the Formula I in which $R_1$ represents an alkoxycarbonyl radical is first prepared, this compound (I) is then reacted with an alkaline agent and the resulting product is finally treated with an acid or an ion-exchange resin to liberate the carboxyl function.

Under the preferred conditions for carrying out this process, the alkaline agent chosen is a hydroxide, a carbonate or an alkali metal bicarbonate, such as sodium hydroxide, sodium carbonate or sodium bicarbonate. The reaction is carried out in a solvent which enables the reaction mixture to be homogenised, such as aqueous methanol, and at the boiling point of the reaction mixture. When the reaction is complete, the reaction mixture is evaporated to dryness under vacuum. The required compound of Formula I is then obtained in the form of its alkali metal salt. The free acid is then formed by conventional methods such as the action of an acid (for example sulphurous acid) or by passing the salt over an ion-exchange resin.

The new pregnane derivatives of the general Formula I according to the invention are very useful substances in human and animal theraphy, especially owing to their remarkable antininflammatory action.

The pharmacological study of these derivatives in animals has demonstrated their thymolytic action which was assayed in rats by the technique of Stephenson (N.R.) J. Pharm, Pharmacol. (1960), 12, 411–415. Different doses of the products were injected subcutaneously in the form of a solution or suspension in ground nut oil every morning and evening for 3 days. The animals were killed on the fourth day. The thymus glands were then removed and their weights expressed in terms of mg. per 100 g. of body weight. A similar method was carried out on the control batches. The percentage of involution of the thymus gland in the treated animals was evaluated in relation to the mean value of the weight of the thymus in the control animals. The results obtained are summarised in the table below as a function of the doses administered. They show that the new derivatives of pregnane according to the invention have a very marked thymolytic action.

TABLE

| Product described in Example number | Percentage of involution of the thymus as a function of the doses administered, expressed in mg./kg. | | | |
|---|---|---|---|---|
| | 100 | 10 | 1 | 0.1 |
| 4 | | 59 | 16.5 | |
| 5 | 39 | 14 | 12 | 0 |
| 6 | 57 | 32 | 16 | 11 |
| 7 | 77 | 76 | 14 | 0 |
| 8 | 84 | 71 | 53 | 5 |
| 9 | | 85 | 79 | 26 |
| 10 | 83 | 73 | 65 | 48 |
| 15 | 30 | 10 | 7 | 19 |
| 16 | 16 | 4 | 11 | 14 |
| 17 | 69 | 74 | 68 | 7 |

Furthermore, the action of the product described in Example 9 below on liver glycogen was studied and it was found to cause a marked increase in the glycogen level.

Owing to their interesting pharmacological action, the products of Formula I are very useful therapeutic substances, and the invention also covers the use of these products as medicaments and particularly as antiinflammatory medicaments in human or veterinary medicine.

These products may be used in man, for example for treating acute or chronic rheumatic conditions, inflammatory dermatitis, asthma or virus hepatitis. The active dose varies according to the product used, the subject treated, the disease and the route of administration, and may, for example, be 1 mg. to 100 mg. per day administered orally in man.

As medicaments, the products of Formula I may be administered parenterally, by the digestive route or locally.

The invention also covers pharmaceutical compositions containing at least one of the products of Formula I as its active principle. These pharmaceutical compositions are suitable for administration and may, for example, be liquid or solid and be present in the pharmaceutical forms commonly used in human or veterinary medicine, for example plain or sugar-coated tablets, capsules, granules, solutions, syrups, suppositories, injections, ointments, creams, gels or aerosols. They are prepared by the usual methods. The active principle or principles may be incorporated in them with the usual excipients used in pharmaceutical compositions, such as talcum, gum arabic, lactose, starch, magnesium stearate, cocoa butter, aqueous or non-aqueous vehicles, animal or vegetable fats, paraffin derivatives, glycols, various wetting agents, dispersing or emulsifying agents and preservatives.

The chemical nonmenclature used in the present application is that of the International Union of Pure and Applied Chemistry (I.U.P.A.C.), J.A.C.S. (1960), 82, 5,577.

Solely illustrative examples according to the invention are now given.

EXAMPLE 1

17,21-(2-propenylidenedioxy)-pregn-4-ene-3,11,20-trione

A mixture of 5 g. (0.0139 mol) of 17,21-dihydroxypregn-4-ene-3,11,20-trione, 12 g. (0.092 mol) of 1,1-diethoxy-2-propene and 500 ml. of anhydrous benzene containing 12.5 mg. of p-toluenesulphonic acid is boiled under reflux for one hour. After cooling, a few drops of pyridine are added and the solvent is evaporated under vacuum. The residue is stirred up in hexane, the precipitate obtained is filtered off and recrystallised from ether, and 17,21-(2-propenylidene-dioxy)-pregn-4-ene - 3,11,20 - trione is obtained in the form of white crystals. Melting point: 147° C. in an open capillary tube;

$[\alpha]_D^{25}: +179°$ (c.=1, $CHCl_3$)

Analysis.—Calcd. for $C_{24}H_{30}O_5$ (percent): C, 72.3; H. 7.6. Found (percent): C, 72.2; H, 8.0.

EXAMPLE 2

17,21-(2-propenylidenedioxy)-pregn-4-ene-3,11,20-trione

A mixture of 5 g. (0.0139 mol) of 17,21-dihydroxypregn-4-ene-3,11,20-trione, 12 g. (0.092 mol) of 1,1-diethoxy-2-propene and 500 ml. of anhydrous benzene containing 12.5 mg. of monochloroacetic acid is maintained at its boiling point under reflux for 96 hours. The ethanol formed is driven off azeotropically. After cooling, the solvent is evaporated under vacuum after the addition of a few drops of pyridine. The excess of 1,1-diethoxy-2-propene is removed by washing with hexane, and the residue obtained, dissolved in a mixture of 95 parts of benzene and 5 parts of ether, is chromatographed over 50 g. of activated magnesium silicate. The product is eluted with the same mixture of benzene and ether, the eluate is concentrated and the solid residue is recrystallised from ether. 17,21-(2-propenylidenedioxy)-pregn-4-ene-3,11,20-trione is obtained in the form of white crystals. Melting point: 147° C. in an open capillary tube. This product is identical with that described in Example 1.

EXAMPLE 3

17,21-(2-propenylidenedioxy)-pregn-4-ene-3,20-dione

Using the method described in Example 1 but starting from 0.5 g. (0.00144 mol) of 17,21-dihydroxy-pregn-4-ene-3,20-dione, 17,21-(2-propenylidenedioxy)-pregn-4-ene-3,20-dione is obtained after recrystallisation from ether in the form of white crystals. Melting point: 150° C. in an open capillary tube;

$[\alpha]_D^{25}$: +112° (c.=1, CHCl$_3$)

*Analysis.*—Calcd. for $C_{24}H_{32}O_4$ (percent): C, 75.0; H, 8.4. Found (percent): C, 75.0; H, 8.5.

EXAMPLE 4

17,21-(2-propenylidenedioxy)-pregna-1,4-diene-3,11,20-trione

Employing the method described in Example 1 but starting from 1.5 g. (0.0042 mol) of 17,21-dihydroxy-pregna-1,4-diene-3,11,20-trione and after recrystallisation from ether, 17,21-(2-propenylidenedioxy)-pregna-1,4-diene-3,11,20-trione is obtained in the form of white crystals. Melting point: 170°–172° C. in an open capillary tube;

$[\alpha]_D^{25}$: +156° (c.=1, CHCl$_3$)

*Analysis.*—Calcd. for $C_{24}H_{28}O_5$: C, 72.7; H, 7.1. Found (percent): C, 72.7; H, 7.1.

EXAMPLE 5

17,21-(2-butenylidenedioxy)-pregn-4-ene-3,11,20-trione

5 g. (0.0139 mol) of 17,21-dihydroxy-pregn-4-ene-3,11,20-trione are suspended in a mixture of 500 ml. of anhydrous benzene, 12.5 mg. of p-toluenesulphonic acid and 12 g. (0.083 mol) of 1,1-diethoxy-2-butene. The reaction mixture is stirred at room temperature for 24 hours. The solvent is evaporated under vacuum after the addition of a few drops of pyridine, and the residue is chromatographed over 150 g. of activated magnesium silicate. The product is eluted with a mixture of 9 parts of benzene and 1 part of ether. By concentration of the eluate, 17,21-(2-butenylidenedioxy)-pregn-4-ene-3,11,20-trione is obtained in the form of white crystals. Melting point: 167°–169° C. in an open capillary tube;

$[\alpha]_D^{25}$: +150.2° (c.=0.4, CHCl$_3$)

*Analysis.*—Calcd. for $C_{25}H_{32}O_5$ (percent): C, 72.8; H, 7.8. Found (percent): C, 72.4; H, 8.1.

EXAMPLE 6

17,21-(3-butenylidenedioxy)-pregn-4-ene-3,11,20-trione

Following the method described in Example 1 and starting from 5 g. (0.0139 mol) of 17,21-dihydroxy-pregn-4-ene-3,11,20-trione and 8 g. (0.0555 mol) of 1,1-diethoxy-3-butene, 17,21-(3-butenylidenedioxy)-pregn-4-ene-3,11,20-trione is obtained in the form of white crystals after chromatography over activated magnesium silicate and recrystallisation from ether. Melting point: 164°–170° C. in an open capillary tube.

$[\alpha]_D^{25}$: +146.2° (c.=1, CHCl$_3$)

*Analysis.*—Calcd. for $C_{25}H_{32}O_5$ (percent): C, 72.8; H, 7.8. Found (percent): C, 72.8; H, 7.8.

EXAMPLE 7

11β-hydroxy-17,21-(2-propenylidenedioxy)-pregn-4-ene-3,20-dione

A mixture of 10 g. (0.0276 mol) of 11β,17,21-trihydroxy-pregn-4-ene-3,20-dione, 3.6 g. (0.0276 mol) of 1,1-diethoxy-2-propene and 2 l. of anhydrous benzene containing 25 mg. of p-toluene sulphonic acid is kept boiling under reflux for 27 hours. After cooling, the insoluble product is filtered off. The solvent is evaporated under vacuum after the addition of a few drops of pyridine. The residue is stirred up with hexane and the precipitate obtained is filtered off and taken up in benzene. The reaction mixture is filtered and the filtrate is chromatographed over 300 g. of activated magnesium silicate. The product is eluted with a mixture of 9 parts of benzene and 1 part of ether. After concentrating the eluate, a crystalline product is isolated which is recrystallised from ether. 11β-hydroxy-17,21-(2-propenylidenedioxy)-pregn-4-ene-3,20-dione is obtained in the form of white crystals. Melting point: 166° C. in an open capillary tube;

$[\alpha]_D^{25}$: +135.5° (c.=0.8, CHCl$_3$)

*Analysis.*—Calcd. for $C_{24}H_{32}O_5$ (percent): C, 72.0; H, 8.1. Found (percent): C, 72.0; H, 8.1.

EXAMPLE 8

11β-hydroxy-17,21-(2-propenylidenedioxy)-pregna-1,4-diene-3,20-dione

Using the method described in Example 7 but starting from 4 g. (0.0111 mol) of 11β,17-21-trihydroxy-pregna-1,4-diene-3,20-dione and after a reflux time of 40 h., 11β-hydroxy-17,21-(2-propenylidenedioxy)-pregna-1,4-diene-3,20-dione is obtained in the form of white crystals after recrystallisation from ether. Melting point: 160° C. in an open capillary tube:

$[\alpha]_D^{25}$: +97.4° (c.=1, CHCl$_3$)

*Analysis.*—Calcd. for $C_{24}H_{30}O_5$ (percent): C, 72.3; H, 7.6. Found (percent): C, 72.2; H, 7.8.

EXAMPLE 9

9-fluoro-11β-hydroxy-16α-methyl-17,21-(2-propenylidenedioxy)-pregna-1,4-diene-3,20-dione

Using the method described in Example 7 but starting from 4 g. (0.0102 mol) of 9-fluoro-11β, 17,21-trihydroxy-16α-methyl-pregna-1,4-diene-3,20-dione and 1.56 g. (0.012 mol) of 1,1-diethoxy-2-propene, 9-fluoro-11β-hydroxy-16α-methyl-17,21-(2-propenylidenedioxy)-pregna-1,4-diene-3,20-dione is obtained in the form of white crystals after chromatography in benzene over 30 g. of activated magnesium silicate and recrystallisation from a mixture of acetone and hexane.

Melting point: 225°–229° C. in a capillary tube sealed under vacuum;

$[\alpha]_D^{25}$: +63.2° (c.=1, CHCl$_3$)

*Analysis.*—Calcd. for $C_{25}H_{31}FO_5$ (percent): C, 69.7; H, 7.3. Found (percent): C, 69.7; H, 7.5.

EXAMPLE 10

11β-hydroxy-6α-methyl-17,21-(2-propenylidenedioxy)-pregna-1,4-diene-3,20-dione

Using the method described in Example 7 but starting from 2.5 g. (0.0067 mol) of 11β,17,21-trihydroxy-6α-methyl-pregna-1,4-diene-3,20-dione and after a reflux time of 55 hours, 11β-hydroxy-6-α-methyl-17,21-(2-propenylidenedioxy)-pregna-1,4-diene-3,20-dione is obtained after recrystallisation from 95° ethanol. Melting point: 230°–232° C. in a capillary tube sealed under vacuum.

$[\alpha]_D^{25}$: +114.5° (c.=1, CHCl$_3$)

*Analysis.*—Calcd. for $C_{25}H_{32}O_5$ (percent): C, 72.8; H, 7.8. Found (percent): C, 72.9; H, 7.9.

EXAMPLE 11

9-fluoro-11β-hydroxy-16α-methyl-17,21-(2-propenylidenedioxy)-pregna-1,4-diene-3,20-dione

A mixture of 2 g. (0.0051 mol) of 9-fluoro-11β,17,21-trihydroxy-16α-methyl-pregna-1,4-diene-3,20-dione, 5 g. (0.03 mol) of 3-chloro-1,1-diethoxypropane and 200 ml. of anhydrous benzene containing 5 mg. of p-toluene sulphonic acid is boiled under reflux for one hour. After cooling, a few drops of pyridine are added and the solvent is evaporated off under vacuum. The residue is washed with hexane to remove excess of 3-chloro-1,1-diethoxypropane, and after the residue has been dissolved in a mixture of benzene and ether, it is chromatographed over 60 g. of activated magnesium silicate. The product is eluted with the same mixture, a crystalline product being obtained by concentration. This crystalline product is recrystallised from a mixture of acetone and ether. 9-fluoro-11β-hydroxy-16α-methyl-17,21-(2 - propenylidenedioxy)-pregna-1,4-diene-3,20-dione is thereby obtained in the form of white crystals. Melting point: 225°–228° C. in a capillary tube sealed under vacuum.

This product is identical with that described in Example 9.

EXAMPLE 12

17,21-(2-propenylidenedioxy)-pregn-4-ene-3,11,20-trione

Employing the method described in Example 11, but starting from 5 g. (0.0139 mol) of 17,21-dihydroxy-pregn-4-ene-3,11,20 - trione, 17,21 - (2 - propenylidenedioxy)-pregn-4-ene-3,11,20-trione is obtained after chromatography over 50 g. of activated magnesium silicate in a mixture of 9 parts of benzene and 1 part of ether and recrystallisation from ether. Melting point: 147° C. in an open capillary tube. This product is identical with that described in Example 1.

EXAMPLE 13

11β-hydroxy-17,21-(2-propenylidenedioxy)-pregn-4-ene-3,20-dione

Using the method described in Example 11 but starting from 5 g. (0.0138 mol) of 11β,17,21-trihydroxy-pregn-4-ene-3,20-dione and 2.3 g. (0.0138 mol) of 3-chloro-1,1-diethoxy-propane, 11β-hydroxy-17,21-(2-propenylidenedioxy)-pregn-4-ene-3,20-dione is obtained after chromatography in benzene over 50 g. of activated magnesium silicate and recrystallisation from ether. Melting point: 166° C. in an open capillary tube.

This product is identical with that described in Example 7.

EXAMPLE 14

17,21-(2-bromo-2-propenylidenedioxy)-pregn-4-ene-3,11,20-trione

Using the method described in Example 11 and starting from 5 g. (0.0139 mol) of 17,21-dihydroxy-pregn-4-ene-3,11,20-trione and 12 g. (0.0415 mol) of 2,3-dibromo-1,1-diethoxy-propane, 17,21-(2-bromo-2-propenylidenedioxy)-pregn-4-ene-3,11,20-trione is obtained in the form of white crystals after chromatography over activated magnesium silicate and recrystallisation from ethanol. Melting point: 178° C. in an open capillary tube;

$[\alpha]_D^{25}$: +139° (c.=1, CHCl$_3$)

Analysis.—Calcd. for C$_{24}$H$_{29}$BrO$_5$ (percent): C, 60.4; H, 6.1; Br, 16.8. Found (percent): C, 59.6; H, 6.5; Br, 16.3.

EXAMPLE 15

17,21-(3-ethoxycarbonyl-2-propenylidenedioxy)-pregn-4-ene-3,11,20-trione

Using the method described in Example 1 but starting from 3 g. (0.00835 mol) of 17,21-dihydroxy-pregn-4-ene-3,11,20-trione and 5 g. (0.0248 mol) of ethyl-4,4-diethoxycrotonate, 17,21-(3-ethoxycarbonyl-2-propenylidenedioxy)-pregn-4-ene-3,11,20-trione is obtained in the form of white crystals after chromatography over activated magnesium silicate and recrystallisation from a mixture of ether and pentane. Melting point: 85° C. in an open capillary tube;

$[\alpha]_D^{25}$: +144.1° (c.=1, CHCl$_3$)

Analysis.—Calcd. for C$_{27}$H$_{34}$O$_7$ (percent): C, 68.9; H, 7.3. Found (percent): C, 68.5; H, 7.2.

EXAMPLE 16

17,21-(3-butoxycarbonyl-2-methyl-2-propenylidenedioxy)-pregn-4-ene-3,11,20-trione Using the method described in Example 1 but starting from 15 g. (0.0417 mol) of 17,21-dihydroxy-pregn-4-ene-3,11,20-trione and 23 g. (0.093 mol) of butyl 3-diethoxymethylcrotonate, 17,21-(3-butoxycarbonyl - 2 - methyl-2-propenylidenedioxy)-pregn - 4 - ene-3,11,20-trione is obtained in the form of white crystals after chromatography over activated magnesium silicate and recrystallisation from ether. Melting point: 150° C. in an open capillary tube;

$[\alpha]_D^{25}$: +120° (c.=1, CHCl$_3$)

Analysis.—Calcd. for C$_{30}$H$_{40}$O$_7$ (percent): C, 70.3; H, 7.9. Found (percent): C, 70.2; H, 8.0.

EXAMPLE 17

17,21-(3-butoxycarbonyl - 2 - methyl - 2 - propenylidenedioxy) - 9 - fluoro-11β-hydroxy-16α-methyl-pregna-1,4-diene-3,20-dione Using the method described in Example 1 but starting from 2.8 g. (0.00585 mol) of 9-fluoro-11β,17,21-trihydroxy-16α-methyl-pregna-1,4-diene-3,20-dione and 3.7 g. (0.0152 mol) of butyl 3-diethoxymethyl crotonate, 17,21-(3-butoxycarbonyl-2-methyl - 2 - propenylidenedioxy)-9-fluoro-11β-hydroxy-16α-methyl-pregna - 1,4 - diene-3,20-dione is obtained in the form of white crystals after chromatography over activated magnesium silicate and recrystallisation from a mixture of acetone and hexane. Melting point: 67°–70° C. in an open capillary tube;

$[\alpha]_D^{25}$: +41.3° (c.=1, CHCl$_3$)

Analysis.—Calcd. for C$_{31}$H$_{41}$FO$_7$ (percent): C, 68.4; H, 7.6. Found (percent): C, 67.0; H, 8.0.

EXAMPLE 18

17,21-(3-carboxy-2-methyl-2-propenylidenedioxy)-pregn-4-ene-3,11,20-trione

A mixture of 2 g. (0.004 mol) of 17,21-(3-butoxycarbonyl - 2 - methyl - 2 - propenylidenedioxy)-pregn-4-ene-3,11,20-trione and 672 mg. (0.008 mol) of sodium bicarbonate in 200 ml. of methanol and 20 ml. of water is boiled under reflux for 20 hours. The solvents are removed by evaporation to dryness under vacuum, the residue obtained is taken up in 200 ml. of water, and sulphur dioxide is passed through this solution. The precipitate formed is extracted with ethyl acetate. The solvent is removed by evaporation to dryness under vacuum and 17,21-(3-carboxy - 2 - methyl - 2 - propenylidenedioxy)-pregn-4-ene-3,11,20-trione is obtained in the form of white crystals.

Melting point: 120° C. in an open capillary tube;

$[\alpha]_D^{25}$: +138° (c.=1, CHCl$_3$)

Analysis.—Calcd. for C$_{26}$H$_{32}$O$_7$ (percent): C, 68.4; H, 7.1. Found (percent): C, 68.2; H, 7.2.

EXAMPLE 19

17,21-(3-carboxy-2-propenylidenedioxy)-pregn-4-ene-3,11,20-trione

Using the method described in Example 18 but starting from 4.7 g. (0.01 mol) of 17,21-(3-ethoxycarbonyl-2-propenylidenedioxy)-pregn - 4 - ene-3,11,20-trione, 17,21-(3-carboxy - 2 - propenylidenedioxy)-pregn - 4 - ene-3,11,20-trione is obtained in the form of white crystals. Melting point: 150° C. in an open capillary tube;

$[\alpha]_D^{25}$: +176.8° (c.=0.9, CHCl$_3$)

Analysis.—Calcd. for C$_{25}$H$_{30}$O$_7$ (percent): C, 67.9; H, 6.8. Found (percent): C, 67.9; H, 6.9.

EXAMPLE 20

Tablets with the following formulation are prepared:

9-fluoro-11β-hydroxy-16α-methyl-17,21-(2-propenylidene-dioxy)-pregna-1,4-diene-3,20-dione: 5 mg.
Excipient sufficient for a tablet made up to 200 mg.

(Details of the excipient: lactose, starch, talcum and magnesium stearate.)

EXAMPLE 21

Tablets of the following formulation are prepared:

11β-hydroxy-6α-methyl-17,21-(2-propenylidenedioxy)-pregna-1,4-diene-3,20-dione: 5 mg.
Excipient sufficient for a tablet made up to 200 mg.

(Details of excipient: lactose, starch, talcum and magnesium stearate.)

EXAMPLE 22

An ointment of the following formulation is prepared:

9-fluoro-11β-hydroxy-16α-methyl-17,21-(2-propenylidene-dioxy)-pregna-1,4-diene-3,20-dione: 0.5 g.
Excipient sufficient for 100 g.

EXAMPLE 23

An injectable preparation of the following formulation is prepared:

9-fluoro-11β-hydroxy-16α-methyl-17,21-(2-propenylidene-dioxy)-pregna-1,4-diene-3,20-dione: 20 mg.
Injectable excipient sufficient for 1 ml.

We claim:

1. A cyclic acetal derivative of pregnane of formula:

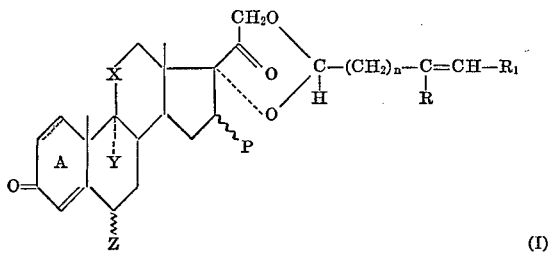

in which X represents a substituent selected from the group consisting of carbonyl radical (CO), methylene radical ($CH_2$) and hydroxymethylene radical (CHOH) whose hydroxyl substituent is in a position selected from the group consisting of α and β positions, Y represents a substituent selected from the group consisting of hydrogen and fluorine, Z represents a substituent selected from the group consisting of hydrogen and methyl, P represents a substituent selected from the group consisting of hydrogen, alkyl radicals containing not more than two carbon atoms and alkylidene radicals containing not more than two carbon atoms, $n$ is a number selected from the group consisting of 0 and 1, R represents a substituent selected from the group consisting of hydrogen, halogens and alkyl radicals containing not more than three carbon atoms, and $R_1$ represents a substituent selected from the group consisting of hydrogen, alkyl radicals containing not more than three carbon atoms, carboxyl and alkoxycarbonyl radicals whose alkoxy substituent contains not more than five carbon atoms, and in which the broken line in the ring A of the formula indicates the optional presence of a double bond.

2. A cyclic acetal derivative of pregnane corresponding to the Formula I of claim 1, in which X represents a substituent selected from the group consistnig of carbonyl radical (CO) and hydroxymethylene radical (CHOH) whose hydroxyl substituent is in a position selected from the group consisting of α and β positions, Y represents a substituent selected from the group consisting of hydrogen and fluorine, Z represents a substituent selected from the group consisting of hydrogen and methyl, P represents a substituent selected from the group consisting of hydrogen and methyl, $n$ is a number selected from the group consisting of 0 and 1, R represents a substituent selected from the group consisting of hydrogen and methyl, and $R_1$ represents a substituent selected from the group consisting of hydrogen and alkoxycarbonyl radicals whose alkoxy substituent contains not more than five carbon atoms, and in which the broken line in the ring A of the Formula I indicates the optional presence of a double bond.

3. A cyclic acetal derivative of pregnane corresponding to the Formula I of claim 1, in which X represents a hydroxymethylene radical (CHOH) whose hydroxyl substituent is in a position selected from the group consisting of α and β positions, Y represents a substituent selected from the group consisting of hydrogen and fluorine, Z, P and R represent substituents selected from the group consisting of hydrogen and methyl, $n$ is zero, and $R_1$ represents a substituent selected from the group consisting of hydrogen and the radical $COOC_4H_9$, and in which the broken line in the ring A of Formula I indicates the optional presence of a double bond.

4. A cyclic acetal derivative of pregnane corresponding to the Formula I of claim 1, in which X represents a hydroxymethylene radical (CHOH) whose hydroxyl substituent is in a poesition selected from the group consisting of α and β positions, Y represents a substituent selected from the group consisting of hydrogen and fluorine, Z, P and R represent substituents selected from the group consisting of hydrogen and methyl, $n$ is zero, and $R_1$ represents a substituent selected from the group consisting of hydrogen and the radical $COOC_4H_9$, and in which the broken line in the ring A of Formula I indicates the presence of a double bond.

5. A cyclic acetal derivative of pregnane corresponding to the Formula I of claim 1, in which X represents a hydroxymethylene radical (CHOH) whose hydroxyl substituent is in a position selected from the group consisting of α and β positions, Y represents a substituent selected from the group consisting of hydrogen and fluorine, Z and P represent a substituent selected from the group consisting of hydrogen and methyl, $n$ is zero, and R and $R_1$ represent hydrogen, and in which the broken line in the ring A of Formula I indicates the presence of a double bond.

6. 9-fluoro - 11β - hydroxy-16α-methyl-17,21-(2-propenylidenedioxy)-pregna-1,4-diene-3,20-dione.

7. 11β-hydroxy-6α-methyl - 17,21 - (2-propenylidenedioxy)-pregna-1,4-diene-3,20-dione.

8. A process for the preparation of a cyclic acetal derivative of pregnane according to Formula I of claim 1, wherein $n$ is 0, which comprises reacting in the presence of an acid catalyst a β-halogenated dialkylacetal of the formula:

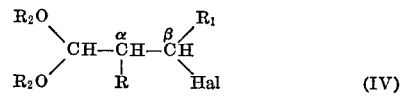

in which R, $R_1$ and $R_2$ have the meanings just indicated and Hal is a halogen substituent selected from the group consisting of bromine and chlorine, with a pregnane derivative of the formula:

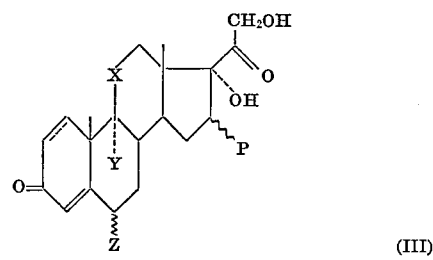

in which X, Y, Z and P have the meanings indicated above.

9. A process according to claim 8, in which the acid catalyst is selected from the group consisting of p-toluenesulphonic acid, monochloroacetic acid, oxalic acid and trifluoroacetic acid.

10. A process for the preparation of a cyclic acetal derivative of pregnane according to Formula I of claim 1, in which X, Y, Z, P, $n$, R and the broken line in the ring A have the meanings already indicated in the said claim 1 and $R_1$ represents a carboxyl radical, process which comprises preparing first a compound of Formula I in which X, Y, Z, P, $n$, R and the broken line in the ring A have the meanings already indicated and $R_1$ represents an alkoxycarbonyl radical, then reacting the said compound of Formula I with an alkaline reagent selected from the group consisting of alkali metal hydroxides, carbonates and bicarbonates, and finally treating the resulting product by conventional methods to yield the free acid form of the compound (I) in which $R_1$ is carboxyl.

References Cited
UNITED STATES PATENTS

| | | | |
|---|---|---|---|
| 3,139,427 | 6/1964 | Heller et al. | 260—239.55 |
| 3,182,056 | 5/1965 | Tanabe | 260—239.55 |

HENRY A. FRENCH, Primary Examiner

U.S. Cl. X.R.

260—999